United States Patent
Velusamy

(10) Patent No.: US 7,336,772 B1
(45) Date of Patent: Feb. 26, 2008

(54) METHODS AND SYSTEMS FOR CONNECTING A CALL USING A NAME OR SERIES OF CHARACTERS

(75) Inventor: Umashankar Velusamy, Tampa, FL (US)

(73) Assignee: Verizon Data Services Inc., Temple Terrace, FL (US)

( * ) Notice: Subject to any disclaimer, the term of this patent is extended or adjusted under 35 U.S.C. 154(b) by 0 days.

(21) Appl. No.: 11/114,811

(22) Filed: Apr. 26, 2005

(51) Int. Cl.
*H04M 1/64* (2006.01)

(52) U.S. Cl. ............................ 379/88.17; 379/88.03; 379/88.12; 379/142.06; 709/225; 725/106

(58) Field of Classification Search ............ 379/88.03, 379/207.02, 88.12, 88.17, 88.22, 142.06; 709/225; 725/106
See application file for complete search history.

(56) References Cited

U.S. PATENT DOCUMENTS

| | | | |
|---|---|---|---|
| 5,509,058 A | 4/1996 | Sestak et al. | |
| 5,850,433 A | 12/1998 | Rondeau | |
| 6,192,123 B1 | 2/2001 | Grunsted et al. | |
| 6,249,576 B1 | 6/2001 | Sassin et al. | |
| 6,724,749 B1 | 4/2004 | Tashiro et al. | |
| 6,731,642 B1 | 5/2004 | Borella et al. | |
| 6,744,861 B1* | 6/2004 | Pershan et al. | 379/88.03 |
| 6,763,020 B1 | 7/2004 | Hon | |
| 2004/0225733 A1* | 11/2004 | Tesink et al. | 709/225 |
| 2005/0069097 A1* | 3/2005 | Hanson et al. | 379/88.12 |

* cited by examiner

*Primary Examiner*—Gerald Gauthier

(57) ABSTRACT

Methods and systems for connecting a call using a name or series of characters are disclosed. A user provides data pertaining to a call from the user to a called party. The data includes name information that corresponds to the called party. A query may be sent to a global name database to search for a telephone number that corresponds to the name information. During the search, a determination may be made as to whether the global name database has multiple telephone numbers that correspond to the name information. When the name information corresponds to multiple telephone numbers, one of the telephone numbers is selected based on preference information associated with the user. Thereafter, the call is routed to a device associated with the selected telephone number.

18 Claims, 13 Drawing Sheets

| Name | Phone Number |
|---|---|
| www.verizon.com | 1-800-555-1234 |
| Verizon Voice Portal | 1-800-555-2233 |
| Elizabeth Smith | 202-321-1111 |
| Beth Smith | 202-321-1111 |
| John Smith | 202-321-1111 |
| Ben Williams | 415-444-3838 |
| Dominic's Restaurant | 212-555-6767 |
| Dominic's Restaurant | 703-333-5858 |
| Dominic's Restaurant | 301-222-4949 |
| Ms. Universe | 302-292-6326 |
| Tampa Police | 813-976-8050 |
| NY Stock Exchange | 212-444-5623 |
| Prom Queen 2004 | 212-555-8888 |

FIG. 10

| Name | Device Identifier | Device Type |
|---|---|---|
| George Hughes | 192.198.166.100 | IP Phone |
| Rex Video Serivces | A5454SDTH548 | Video Phone |
| Tampa Rock Star | 490154100837810 | Mobile - IMEI |

METHODS AND SYSTEMS FOR CONNECTING A CALL USING A NAME OR SERIES OF CHARACTERS

BACKGROUND

Typically, in order for a user to place a telephone call, the user needs to enter a 7-digit (or longer) telephone number. Because numbers of this length are difficult to remember, placing the call becomes problematic. Users may enlist the aid of a paper or electronic telephone directory to help them associate a name with a telephone number. For example, the user may look up the name of a person or business in the directory. Upon finding the desired entry in the directory, the user may place a call to the telephone number associated with the entry by entering the number on the user's calling device. Alternatively, if the user is utilizing an electronic directory that is stored in a local memory associated with the user's calling device, then the user may place the call by selecting the appropriate entry and pressing some kind of call button.

Using a directory in this fashion, however, has several limitations. For example, paper directories are often bulky and need to be carried around with the user. Electronic directories often have limited storage space for numbers and also may need to be carried around with the user. Also, in the case where the electronic directory is stored in a local memory associated with the calling device, the user will only be able to benefit from the directory when using that particular calling device. If a different calling device is being used and no directory is present, then the remembering the name associated with the directory entry does no good, and the number itself needs to be remembered.

The user may also use mnemonic dialing as a way of remembering telephone numbers. For example, suppose a user needs to remember the phone number, 733-6328. The user may "spell out" a word or words for the number using the letters associated with the digits of the number on the calling device keypad. Exemplary words for 733-6328 are "red meat." Creating and using mnemonics, however, can be a difficult task as well, because many telephone numbers do not have mnemonics that both are easy to remember and also remind a user of the person or business being called.

Current systems thus do not provide for effective ways of placing calls without the need to remember telephone numbers. Accordingly, there is a need for methods and systems for placing a call using a name or series of characters.

BRIEF DESCRIPTION OF THE DRAWINGS

The accompanying drawings are incorporated in and constitute a part of this specification.

FIG. 10 shows an exemplary table used to translate names to telephone numbers, consistent with the present invention;

FIG. 13 shows an exemplary table used to translate names to device identifiers, consistent with the present invention.

DETAILED DESCRIPTION OF PREFERRED EMBODIMENTS

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

In an exemplary embodiment, methods and systems consistent with the principles of the invention connect a call using a name or series of characters. For example, the exemplary methods and systems receive data pertaining to a call from a user to a called party. The data includes name information that corresponds to the called party. A query may be sent to a database to search for a telephone number that corresponds to the name information. During the search, a determination may be made as to whether the database has multiple telephone numbers that correspond to the name information.

When the name information corresponds to multiple telephone numbers, one of the telephone numbers is selected based on preference information associated with the user. Thereafter, the call is routed to a device associated with the selected telephone number. Exemplary preference information may include, for example, routing the call to a number closest to user location, routing the call to a pre-determined number based on the user's location, routing the call to a pre-determined location based on the time of day, routing the call to a pre-determined location based on the day of the week, or any other criteria desired by the user.

The exemplary methods and systems may also send a notification of a call to a called device. The notification includes information reflecting the name information that corresponds to the called party. In situations where the telephone number of the called device has multiple names associated with it, the called party may use the name information included in the notification to quickly determine the intended recipient of the call, as well as possibly who initiated the call.

Many limitations of local number portability can be overcome using methods and systems consistent with the present invention. For example, when a user changes his telephone number, the user's contacts do not have to worry about learning a new number. Instead, all that is needed is an update of the database that maps the user's name to his telephone number.

Figure 1:
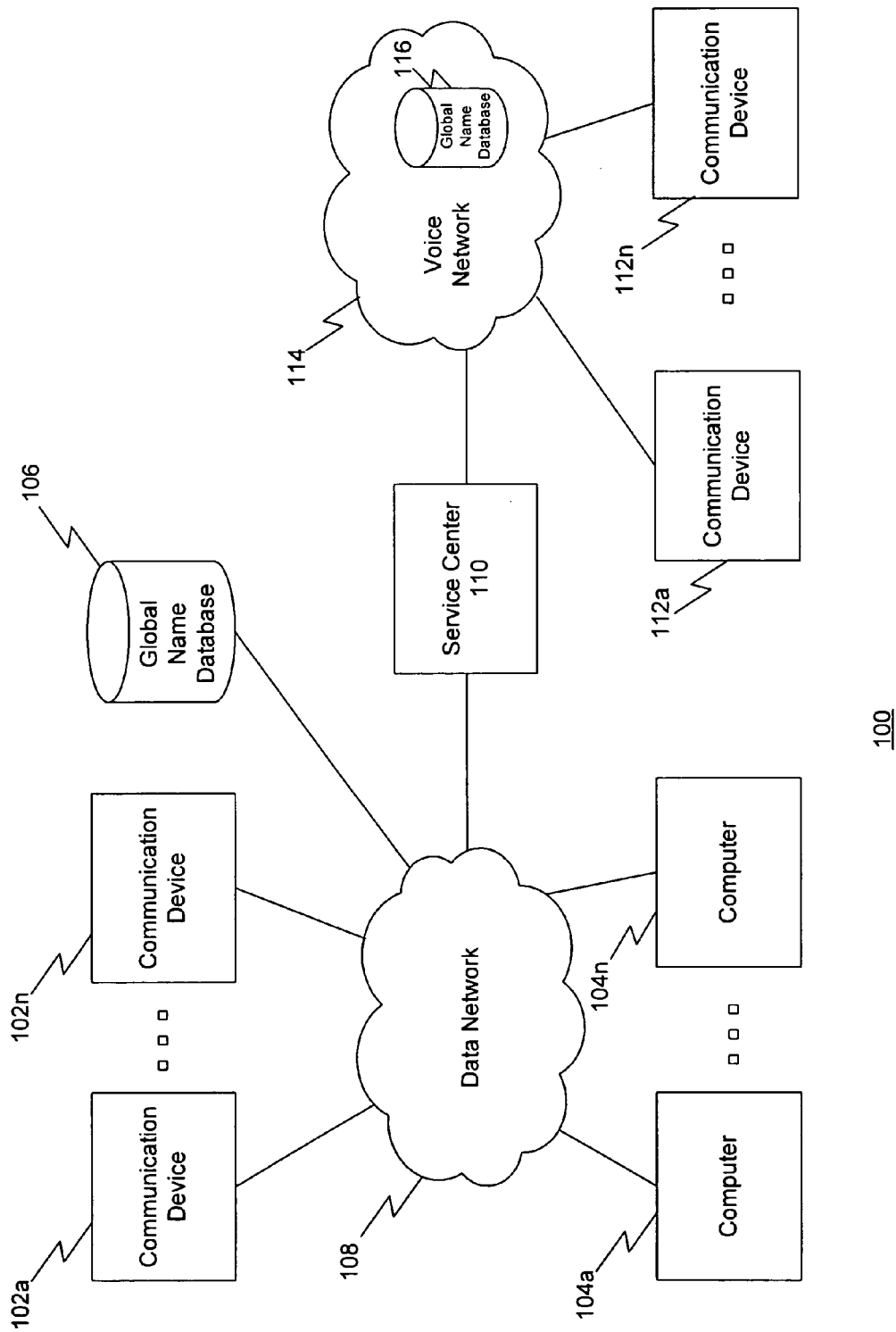
FIG. 1 is a diagram of an exemplary network environment in which features and aspects consistent with the principals of the present invention may be implemented.

FIG. 1 is a block diagram of a network environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Network environment 100 may include communication devices 102a-102n, computers 104a-104n, a global name database 106, a data network 108, a service center 110, communication devices 112a-112n, and a voice network 114, which may further include a global name database 116.

Data network 108 provides communications between the various entities depicted in network environment 100, such as a communication device 102 and service center 110. Data network 108 may be a shared, public, or private network and encompass a wide area or local area. Data network 108 may be implemented through any suitable combination of wired and/or wireless communication networks. By way of example, data network 108 may be implemented through a wide area network (WAN), local area network (LAN), an intranet and/or the Internet. Further, the service center 110 may be connected to multiple data networks 108, such as, for example, to a wireless carrier network, a private data network and the public Internet. Data network 108 may also be used to enable telephonic communication using, for example, voice-over Internet Protocol ("VoIP") technology. Moreover, data network 108 may be a network capable of carrying data, voice, and video, such as a network that utilizes fiber-to-the-premises (FTTP) technology.

Voice network 114 may provide telephony services to allow a calling party to place a telephone call to another party. In one embodiment, voice network 114 may be implemented using a network, such as the Public Switched Telephone Network ("PSTN"). Alternatively, voice network 114 may be implemented on a voice over broadband network, such as a network using voice-over Internet Protocol ("VoIP") technology. Additionally, in other embodiments, voice network 114 may be a video over broadband network, such as, for example, a network for providing two-way video communications. Voice network 114 may also be implemented using a fiber optics network, such as one that utilizes fiber-to-the-premises (FTTP) technology. In another example, voice network 114 may be a wireless broadband network, such as, for example, a network using WiFi (i.e., IEEE 802.11(b) and/or (g)). In yet another example, voice network 114 may be a wireless voice network(s), such as, for example, a cellular or third-generation cellular network. In addition, voice network 114 may be implemented using any single or combination of the above-described technologies consistent with the principles of the present invention. Further, service center 110 may be connected to multiple voice networks 114, such as for example, the voice networks provided by the Verizon companies, voice networks operated by other carriers, and wireless carrier networks.

Service center 110 provides a platform for managing communications over data network 108 and voice network 114. Service center 110 also provides gateway functions, such as code and protocol conversions, to transfer communications between data network 108 and voice network 114. Service center 110 may be implemented using a combination of hardware, software, and/or firmware. For example, service center 110 may be implemented using a plurality of general purpose computers or servers coupled by a network (not shown). Although service center 110 is shown with direct connections to data network 108 and voice network 114, any number and type of network elements may be interposed between service center 110, data network 108, and voice network 114.

Communication devices 102a-102n may be devices that enable users to enter a name or series of characters in order to initiate a call, instead of entering numbers. Exemplary devices that may be used as a communication device 102 may include, for example, the Blackberry™, Ergo Audrey™, mobile phones (with data access functions), Personal Digital Assistants ("PDA") with network connections, IP telephony phones, or generally any device capable of communicating over a data network, and that includes a keyboard or other means of entering a name or series of characters, as well as a suitable display.

Computers 104a-104n provide users with an alternative/additional interface to data network 108. Computers 104a-104n may be implemented using any computer capable of accessing the Internet, such as a general purpose computer or personal computer equipped with a modem or other network interface. A computer 104 may include software that enables a user to enter a name or series of characters and thereafter communicate with a web server to translate the name or series of characters to a telephone number. A click-to-dial service may then be initiated to place a call to a device that corresponds to the telephone number. A click-to-dial service refers to a service where a user may initiate a phone call to a party by interacting with a data network. Exemplary acts of interaction may include clicking on a link corresponding to the party, or otherwise selecting, highlighting, or entering information that corresponds to the party.

Global name databases 106 and 116 may each maintain a central table that may be used to translate a name or series of characters into a corresponding telephone number. Global name database 106 and global name database 116 may store substantially the same data for use in translating names or characters into telephone numbers, so that an update made to one database is made to the other. Global name database 106, for example, may be used in conjunction with communications involving data network 108. Global name database 116, on the other hand, may be used in conjunction with communications involving voice network 114. One of ordinary skill in the art will appreciate that global name database 106 may additionally be used in conjunction with voice network 114, and that global name database 116 may additionally be used in conjunction with data network 108. One of ordinary skill in the art will also appreciate that global name databases 106 and 116 may be replaced by a single global name database that may be used in conjunction with both data network 108 and voice network 114. Global name database 106 and global name database 116 may actually comprise multiple distributed database elements physically located on multiple hardware devices at multiple locations, which may increase the performance, scalability and fault tolerance of such databases.

Generally, a given name or series of characters is permitted to have only one telephone number associated with it. In other words, each name is globally unique. An exception to this, however, is that a given person or entity may register multiple telephone numbers with the same name or series of characters. For example, a business might have multiple branches and thus multiple telephone numbers, all of which may be stored in a global name database under the same name. One of the numbers may thereafter be selected according to user-defined preferences. These user-defined preferences are discussed further below with reference to FIGS. 10 and 11. Even though a person or entity may be allowed to register multiple telephone numbers with the same name, this embodiment does not allow for different people or entities to register an identical name or series of characters.

Communication devices 112a-112n interface with voice network 114 and, similar to communication devices 102a-102n, may be devices that enable users to enter a name or series of characters in order to initiate a call instead of entering numbers. Unlike communication devices 102a-102n, however, communication devices 112a-112n need not have the ability to communicate over a data network (although they may include such capability). Exemplary devices that may be used as a communication device 112 may include, for example, the Blackberry™, Ergo Audrey™, mobile phones, wireline phones, or generally any device capable of communicating over a voice network, and that includes a keyboard or other means of entering a name or series of characters, as well as a suitable display. Although communication devices 112a-112n are shown directly connected to voice network 114, any number of intervening elements, such as a private branch exchange ("PBX"), may be interposed between communication devices 112a-112n and voice network 114.

One of ordinary skill in the art will appreciate that a communication device 102 or 112 may be a device that enables a user to enter a name (or series of characters) or phone number to initiate a call, or it may be a device that only enables a user to enter a name or series of characters to initiate a call.

Figure 2:
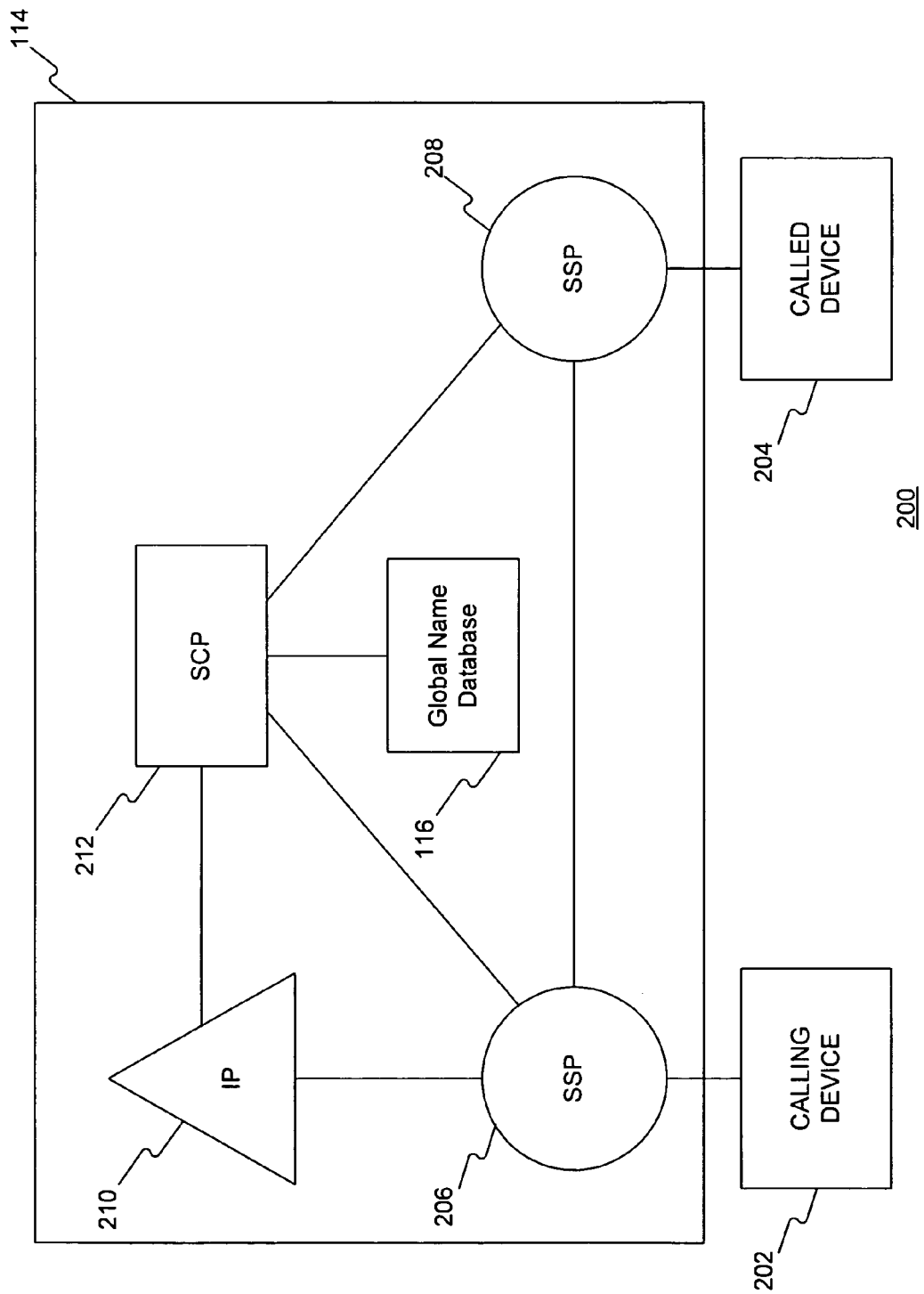
FIG. 2 is a diagram of an exemplary AIN environment in which features and aspects consistent with the principals of the present invention may be implemented.

FIG. 2 is a diagram of an exemplary Advanced Intelligent Network (AIN) environment 200 in which features and aspects consistent with the principles of the present invention may be implemented. In one embodiment, AIN environment 200 of FIG. 2 may exist as part of network environment 100 of FIG. 1. The number of components in environment 200 is not limited to what is shown and other variations in the number of arrangements of components are possible, consistent with embodiments of the invention. The components of FIG. 2 may be implemented through hardware, software, and/or firmware. AIN environment 200 may include calling device 202 and called device 204, both of which are connected to voice network 114. Voice network 114 may include, for example, service switching points (SSP) 206 and 208, an Intelligent Peripheral (IP) 210, a service control point (SCP) 212, and global name database 116.

Calling device 202 may be utilized by a user to initiate a call to another device, such as called device 204. Calling device 202 may be implemented using, for example, a communication device 112. As such, calling device 202 enables a user to enter a name or series of characters to initiate a call instead of numbers.

In the embodiment of FIG. 2, voice network 114 may be implemented using the PSTN and SS7 as a signaling protocol. Although this embodiment of a voice network 104 is described as a PSTN, as discussed above in other embodiments, the voice network 104 may be, for example, a voice or video over broadband network, a wireless broadband network, a wireless voice network, etc. The SS7 protocol allows voice network 114 to provide features, such as call forwarding, caller-ID, three-way calling, wireless services such as roaming and mobile subscriber authentication, local number portability, and toll-free/toll services. The SS7 protocol provides various types of messages to support the features of voice network 114. For example, these SS7 messages may include Transaction Capabilities Applications Part ("TCAP") messages to support event "triggers," and queries and responses between SCP 212 and SSPs 206 and 208.

SCP 212 may be, for example, a standard SCP, an intelligent SCP, an Advanced Intelligent Network (AIN) SCP, a soft switch, or any other network call controller. SCP 212 provides translation and routing services of SS7 messages to support the features of voice network 114, such as call forwarding. In addition, SCP 212 may exchange information with the service center 110 using TCP/IP or SS7. SCP 212 may include service logic used to provide a switch, such as SSP 206 or 208, with specific call processing instructions. SCP 212 may also store data related to various features that a user may activate. Such features may include, for example, call intercept and voice mail. SCP 212 may be implemented using a combination of known hardware and software.

SCP 212 may also be operable to recognize that a call from a communications device, such as calling device 202, was made using name or character information. In turn, SCP 212 may take appropriate action to ensure that the name or character information is translated to a telephone number.

SSPs 206 and 208 provide an interface between voice network 114 and devices 202 and 204, respectively, to setup, manage, and release telephone calls within voice network 114. SSPs 206 and 208 may be implemented as a voice switch, an SS7 switch, or a computer connected to a switch. SSPs 206 and 208 exchange SS7 signal units to support a telephone call between calling device 202 and called device 204. For example, SSPs 206 and 208 may exchange SS7 messages, such as TCAP messages, within message signal units ("MSU") to control calls, perform database queries, and provide maintenance information.

The voice network 114 may also include one or more intelligent peripherals (IP). For example, in FIG. 2, an IP 210 is illustrated as being connected to SSP 206 and SCP 208. IP 210 may be operable to translate a name or series of characters into a telephone number by interacting with global name database 116. For example, IP 210 may be forwarded a call after SCP 212 recognizes that the call requires translation. IPs may also be used for providing functions for interaction between users and the voice network, such as voice mail services, digit collection, customized announcements, voice recognition, etc.

Figure 3:
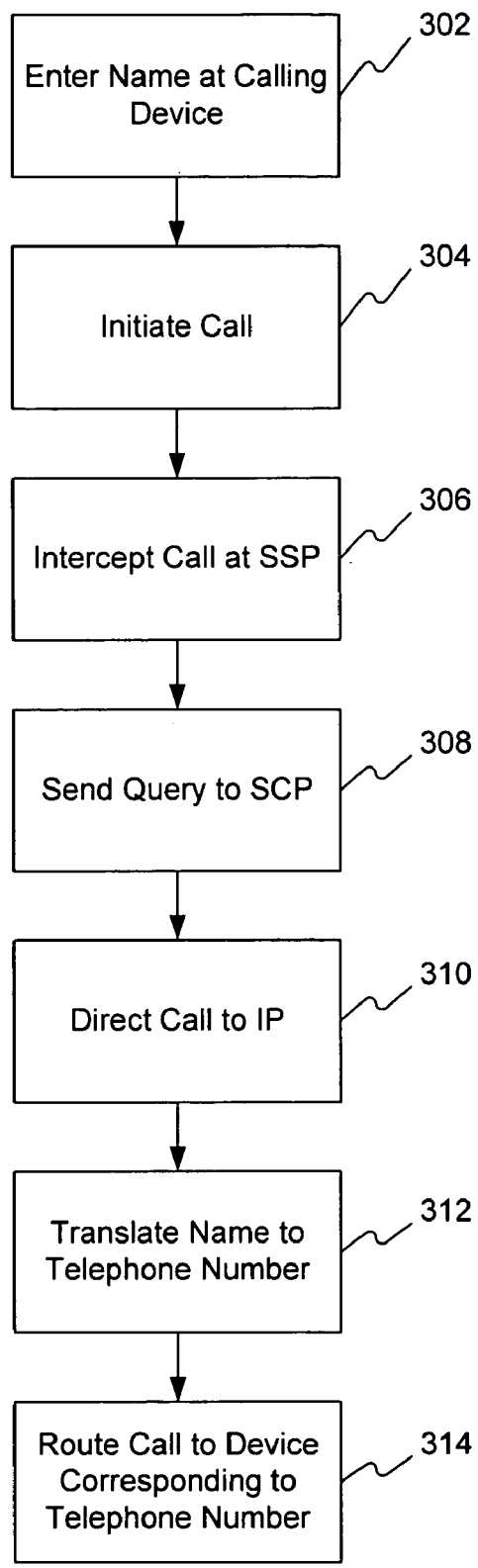
FIG. 3 shows a flowchart of an exemplary method for connecting a call using a name or series of characters in an AIN environment, consistent with the principles of the present invention.

FIG. 3 shows a flowchart of an exemplary method for connecting a call using a name or series of characters in an AIN environment, consistent with the principles of the present invention. Although the steps of the flowchart are described in a particular order, one skilled in the art will appreciate that these steps may be performed in a modified or different order. Further, one or more of the steps in FIG. 3 may be performed concurrently or in parallel.

First, a user may enter a name or a series of characters at a calling device, such as calling device 202 (step 302). For example, a user may decide to place a call to somebody named Susan Farley. Instead of entering a telephone number that corresponds to Susan, the user may enter a name that Susan has registered to correspond to her telephone number. In this case, assume that she has registered the name "Susan A. Farley." As such, the user may simply enter "Susan A. Farley" into calling device 202 using a keypad associated with calling device 202. Preferably, the method permits no other person or entity to have a telephone number associated with "Susan A. Farley."

Once the name has been entered, calling device 202 may initiate a call (step 304). In one embodiment, the call may be routed from calling device 202 to a voice network, such as voice network 114, where an SSP 206 may intercept the call (step 306). The SSP 206 may intercept the call, for example, because it encountered a trigger, such as a terminating attempt trigger or a specific digit string trigger, associated with the call. For example, a trigger may be set at SSP 206 or 206 on each of the lines corresponding to communication devices on which a user may enter names or a series of characters. In this manner, a trigger is set to detect calls received at the SSP that are from communication devices on which a user may enter names or a series of characters. As such, calls from communication devices on which a user may enter names or a series of characters are detected by the triggers. For the purposes of this description, it is those calls that the SSP intercepts. In an alternative environment, such as a soft switch environment, functionality similar to a trigger may be utilized to intercept calls.

In an alternative embodiment, instead of using triggers, SSP 206 may detect that the call was made using names or a series of characters, because SSP 206 is unable to identify a destination telephone number.

After intercepting the call, SSP 206 sends a query to SCP 212 requesting further instructions (step 308). The query may include information that indicates that the call is being placed using a name or series of characters. After receiving the query, SCP 212 recognizes that the call is being placed using a name or series of characters, and instructs SSP 206 to direct the call to IP 210 (step 310). IP 210 may proceed to read the name or character information from call information associated with the call, and interact with global name database 116 in order to translate the name or series of characters into a telephone number. For example, IP 210 may send a query to global name database 116 via SCP 212. The query may include information reflective of the name or series of characters entered by the user at calling device 208.

Global name database 116, in conjunction with IP 210, proceeds to translate the name or series of characters into a telephone number (step 312). One of ordinary skill in the art will appreciate that although global name database 116 is depicted in FIG. 2 as being connected to SCP 212, it may alternatively or additionally be connected directly to IP 210. In such a case, it would not be necessary for IP 210 to communicate with SCP 212 in order to access global name database 116. After the name or series of characters has been translated into a telephone number, the call is routed to a device, such as called device 208, that corresponds to the telephone number (step 314). Further information on translating a name or series of characters to a telephone number is provided below with reference to FIGS. 10 and 11.

Figure 4:
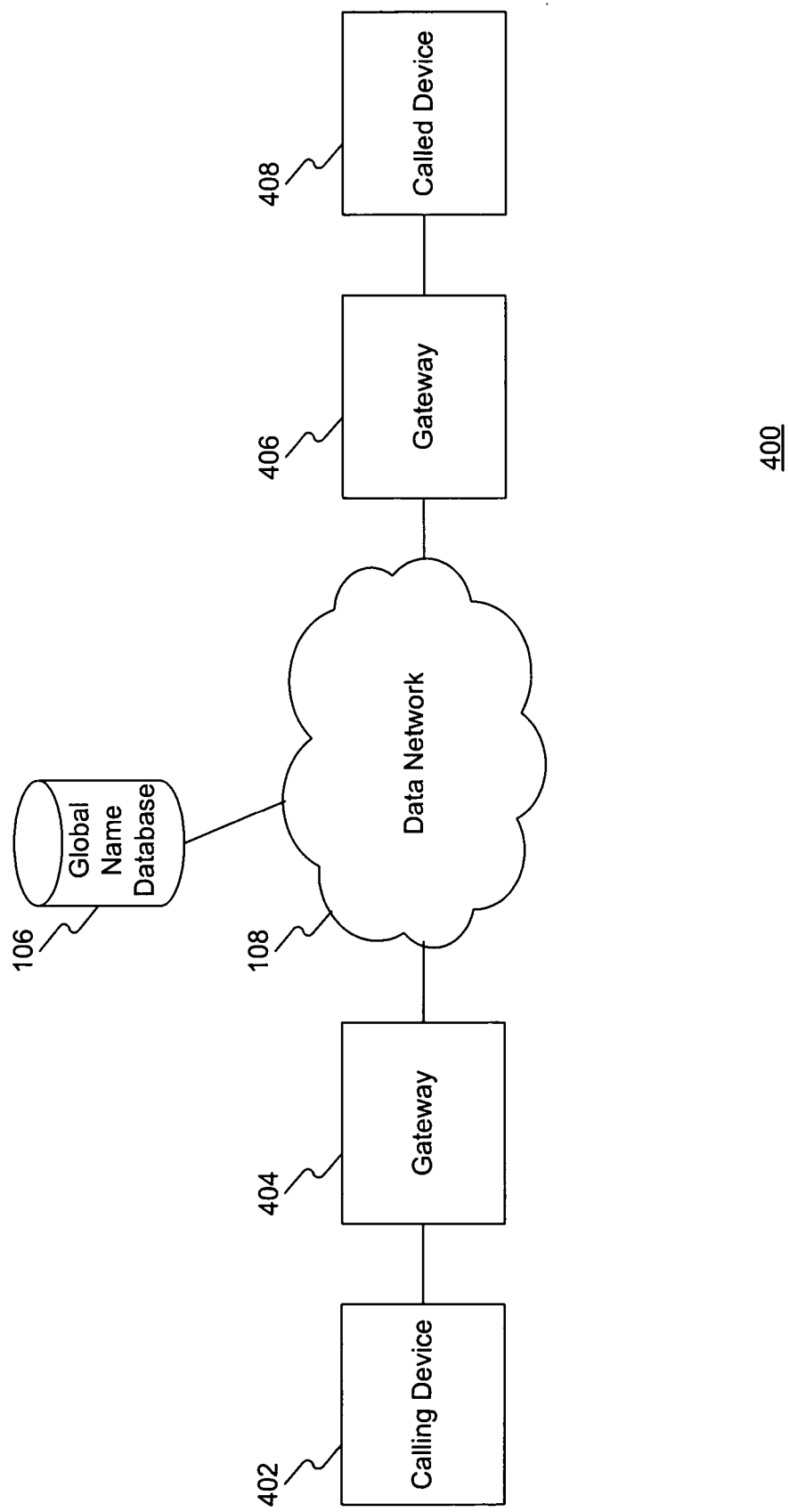
FIG. 4 is a diagram of an exemplary IP telephony environment in which features and aspects consistent with the principals of the present invention may be implemented.

FIG. 4 is a diagram of an exemplary IP telephony environment 400 in which features and aspects consistent with the principals of the present invention may be implemented. In one embodiment, IP telephony environment 400 of FIG. 4 may exist as part of network environment 100 of FIG. 1. The number of components in environment 400 is not limited to what is shown and other variations in the number of arrangements of components are possible, consistent with embodiments of the invention. The components of FIG. 4 may be implemented through hardware, software, and/or firmware. IP telephony environment 400 may include calling device 402, gateways 404 and 406, global name database 106, data network 108, and called device 408.

Calling device 402 may be utilized by a user to initiate a call to another device, such as called device 408. Calling device 402 may be implemented using, for example, a communication device 102. As such, calling device 402 enables a user to enter a name or series of characters to initiate a call, instead of numbers. In one embodiment, calling device 402 may be a device capable of placing calls using IP telephony. For example, calling device 402 may communicate using an IP telephony protocol, such as VoIP, or any other comparable protocol.

Gateways 404 and 406 may be implemented using standard network gateways, with the extra capability of recognizing when an IP telephony call from a communications device was initiated using a name or series of characters. Gateways 404 and 406 may also communicate with global name database 106 to translate the name or series of characters into a telephone number.

Figure 5:
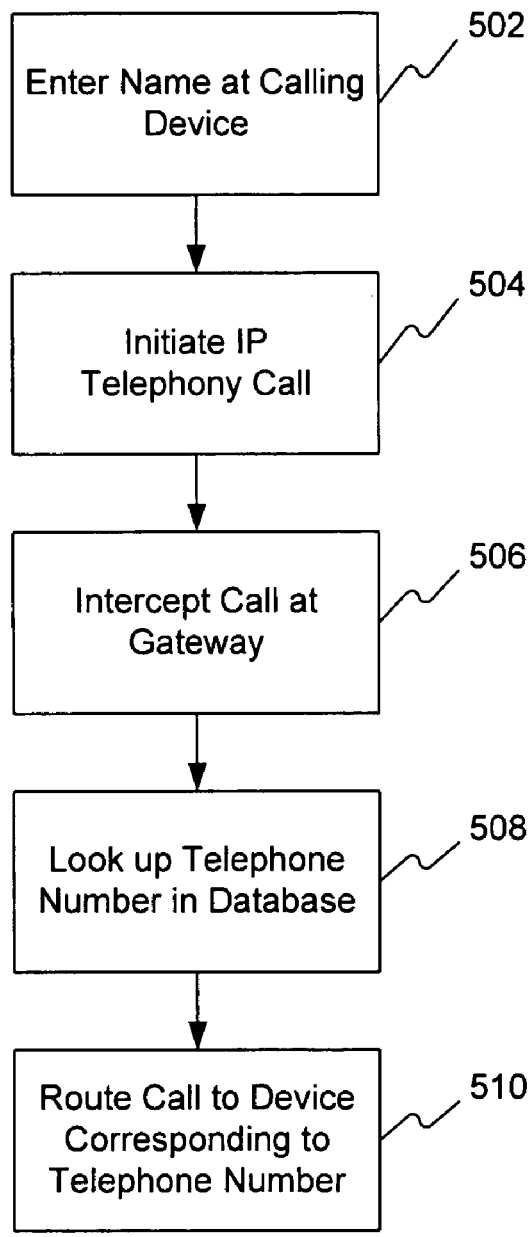
FIG. 5 shows a flowchart of an exemplary method for connecting a call using a name or series of characters in an IP telephony environment, consistent with the principles of the present invention.

FIG. 5 shows a flowchart of an exemplary method for connecting a call using a name or series of characters in an IP telephony environment, consistent with the principles of the present invention. Although the steps of the flowchart are described in a particular order, one skilled in the art will appreciate that these steps may be performed in a modified or different order. Further, one or more of the steps in FIG. 5 may be performed concurrently or in parallel.

A user may enter a name or series of characters on a calling device, such as calling device 402 (step 502). Once the name has been entered, calling device 402 may initiate an IP telephony call (step 504). For example, calling device 402 may utilize a VoIP protocol to place a call to another device over a data network, such as data network 108. Gateway 404 may then intercept the call before passing it on to data network 108 (step 506). Gateway 404 may recognize that the call was initiated using a name or series of characters instead of a telephone number.

Upon making this recognition, gateway 404 may proceed to look up a telephone number corresponding to the name or series of characters in global name database 106 (step 508). For example, gateway 404 may send a query to global name database 106 via data network 108. The query may include information reflective of the name or series of characters entered by the user at calling device 402. Global name database 106, in turn, returns a telephone number corresponding to the name or series of characters to gateway 404. Thereafter, gateway 404 may proceed to route the call to a device corresponding to the returned telephone number (step 510). For example, upon receiving the telephone number from global name database 106, gateway 404 may forward the call to a called device, such as called device 408, via data network 108 and gateway 406 according to normal operations under an IP telephony protocol. Further information on translating a name or series of characters to a telephone number is provided below with reference to FIGS. 10 and 11.

Figure 6:
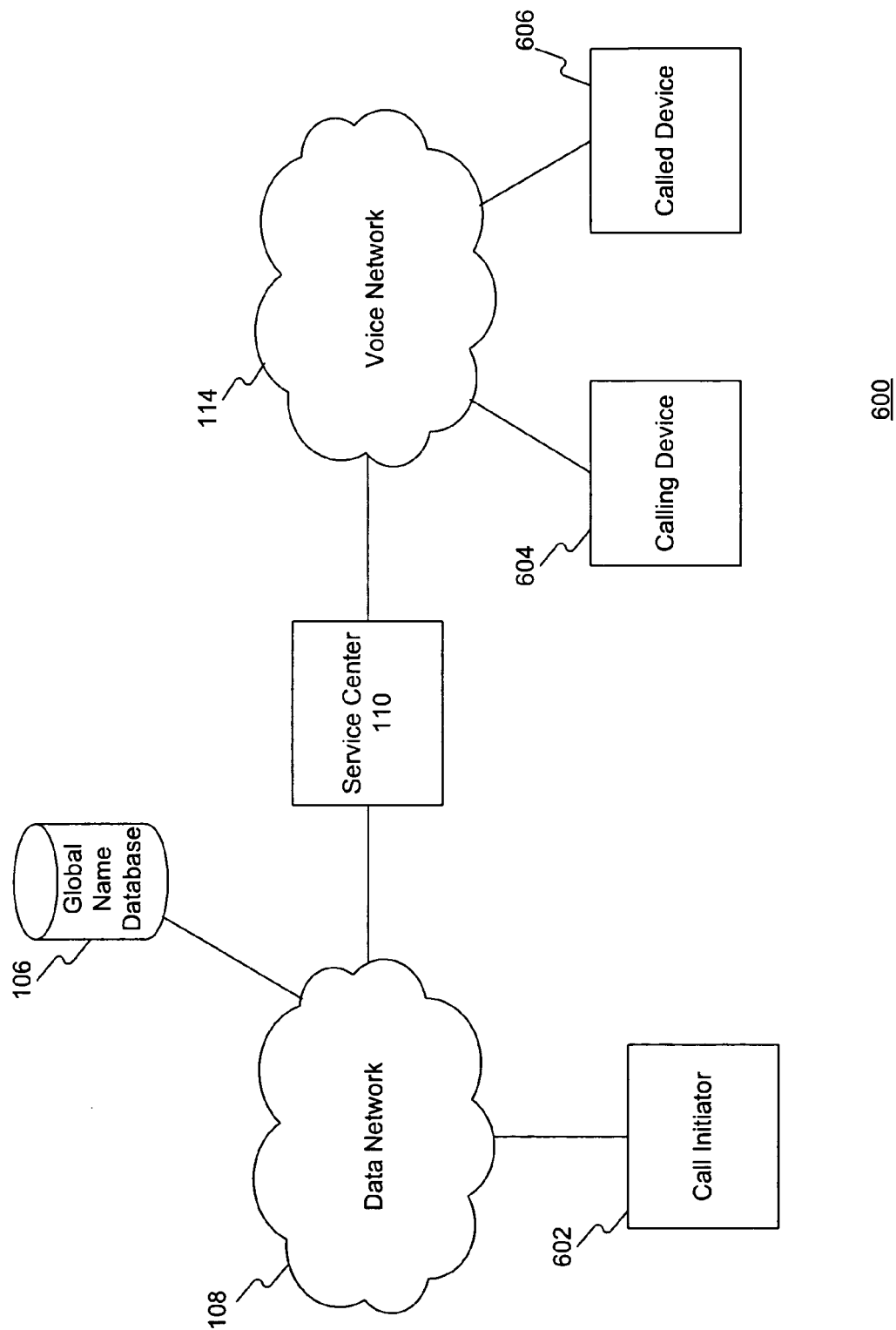
FIG. 6 is a diagram of an exemplary click-to-dial environment in which features and aspects consistent with the principals of the present invention may be implemented.

FIG. 6 is a diagram of an exemplary click-to-dial environment 600 in which features and aspects consistent with the principals of the present invention may be implemented. In one embodiment, click-to-dial environment 600 of FIG. 6 may exist as part of network environment 100 of FIG. 1. The number of components in environment 600 is not limited to what is shown and other variations in the number of arrangements of components are possible, consistent with embodiments of the invention. The components of FIG. 6 may be implemented through hardware, software, and/or firmware. Click-to-dial environment 600 may include call initiator 602, calling device 604, called device 606, global name database 106, data network 108, service center 110, and voice network 114.

Call initiator 602 may be implemented using, for example, a computer 104 from FIG. 1. As such, call initiator 602 may be operable to enable a user to enter a name or series of characters and thereafter communicate with a web server to translate the name or series of characters to a telephone number. The web server may be located, for example, in service center 110 or may be separate from service center 110. A click-to-dial service may then be initiated to place a call to a device that corresponds to the telephone number. As previously, indicated above with reference to FIG. 1, a click-to-dial service refers to a service where a user may initiate a phone call to a party by interacting with a data network. Exemplary acts of interaction may include clicking on a link corresponding to the party, or otherwise selecting, highlighting, or entering information that corresponds to the party.

Service center 110 may be operable to receive information from call initiator 602 indicating that a call should be established between two devices, such as calling device 604 and called device 606. The received information may include the name or series of characters that correspond to the called party. The received information may also include information that identifies a device, such as calling device 604, that corresponds to the user of call initiator 602. Service center 110 may also be operable to communicate with global name database 106 to translate the name or series of characters into a telephone number, and to send information to voice network 114 that enables voice network 114 to establish a call between calling device 604 and called device 606.

Calling device 604 and called device 606 may each be implemented using, for example, a communication device 112.

Figure 7:
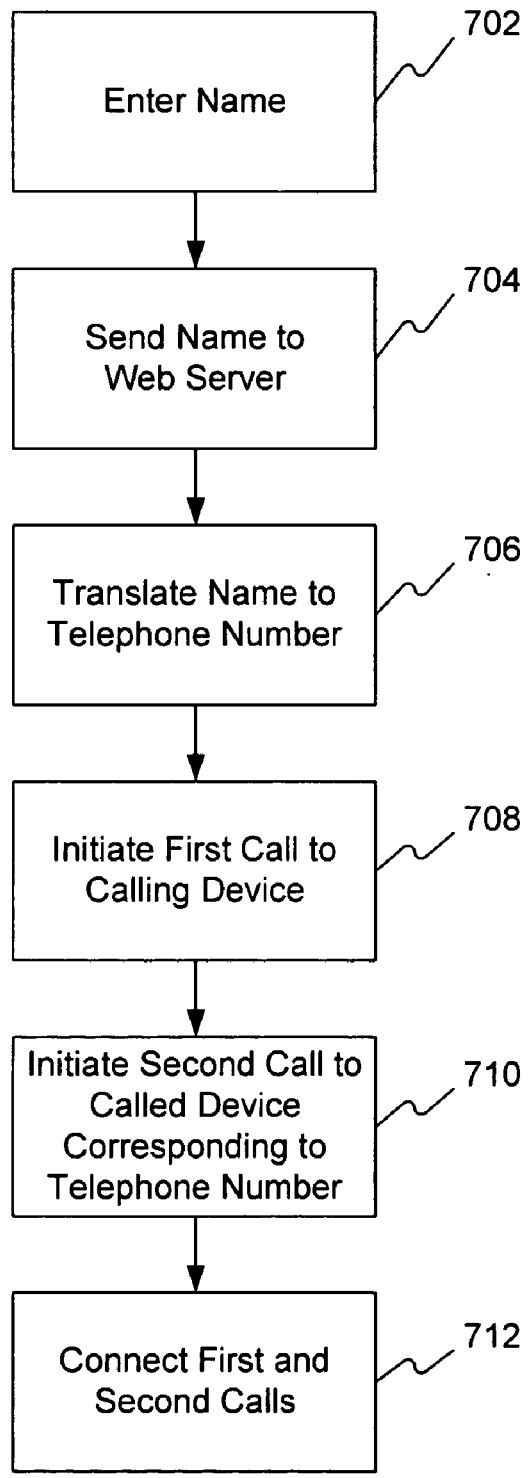
FIG. 7 shows a flowchart of an exemplary method for connecting a call using a name or series of characters in a click-to-dial environment, consistent with the principles of the present invention.

FIG. 7 shows a flowchart of an exemplary method for connecting a call using a name or series of characters in a click-to-dial environment, consistent with the principles of the present invention. Although the steps of the flowchart are described in a particular order, one skilled in the art will appreciate that these steps may be performed in a modified or different order. Further, one or more of the steps in FIG. 7 may be performed concurrently or in parallel.

First, a user may enter a name or series of characters, or otherwise select a link or entry from a list of contacts, at call initiator 602 (step 702). For example, the user may utilize software stored in a memory on call initiator 602, to enter or select the name or series of characters. Alternatively, the user may use a browser program resident on call initiator 602 to access a website on which the user may enter or select the name or series of characters.

In addition to entering or selecting the name or series of characters, the user may need to provide an indication of a communication device on which the user wishes to be contacted. For example, the user may enter a telephone number corresponding to a calling device 604. Alternatively, the user may select a device from a list of devices, where the list is maintained either by call initiator 602 or by a website accessed by call initiator 602. The user's selection from the list may be resolved to a telephone number associated with the selected device. For example, the user may have previously stored a list of one or more devices and associated telephone numbers for each device. In this manner, when the user selects a device from the list, call initiator 602 or a website accessed by call initiator 602 may return the corresponding telephone number.

After the user has entered the name or series of characters, call initiator 602 may proceed to send this information to a web server that may or may not be resident in service center 110 (step 704). This web server may communicate with global name database 106 in order to translate the name or series of characters into a telephone number (step 706). For example, the web server may send a query to global name database 106 via data network 108. The query may include information reflective of the name or series of characters entered by the user at call initiator 602. Global name database 106, in turn, returns a telephone number corresponding to the name or series of characters to the web server. Thereafter, the web server may provide service center 110 with the telephone number, unless the web server is resident in service center 110, in which case service center 110 has already received the telephone number. Further information on translating a name or series of characters to a telephone number is provided below with reference to FIGS. 10 and 11.

Also, if service center 110 does not already have the telephone number of the device on which the calling user is to be contacted, then service center 110 may retrieve or request this information from call initiator 602. One of ordinary skill in the art will appreciate that call initiator 602 may provide this information to service center 110 at the same or a different time than the information reflecting the name or series of characters provided in step 704. In an alternative embodiment, service center 110 may be responsible for storing the list of devices and corresponding telephone numbers for a calling user. As such, service center 110 may retrieve the telephone number of the calling user's device from a memory associated with server center 110.

Once service center 110 has the telephone number of both the calling device 604 and the called device 606, service center 110 may proceed to initiate a first call to calling device 604 (step 708). For example, service center 110 may send a request to voice network 114 to initiate a call between calling device 604 and called device 606. The request may include an indication of the telephone numbers of calling device 604 and called device 606. Upon receiving the request, voice network 114 may initiate the call to calling device 604. In one embodiment, for example, a service control point (SCP) in voice network 114 may receive the request from service center 110 and in turn instruct an intelligent peripheral (IP) or service switching point (SSP) to initiate a call to calling device 604.

The IP or SSP, for example, may then call the calling device 604 and wait for an answer. When a user answers the call, the IP or SSP may detect that the call has been answered and proceed to initiate a second call to called device 606, which corresponds to the telephone number retrieved from global name database 106 (step 710). Thereafter, the IP or SSP may cause the first and second calls to be connected so that a call exists between calling device 604 and called device 606 (step 712). This call can be charged to an account belonging to the user who started the call using call initiator 602.

Figure 8:
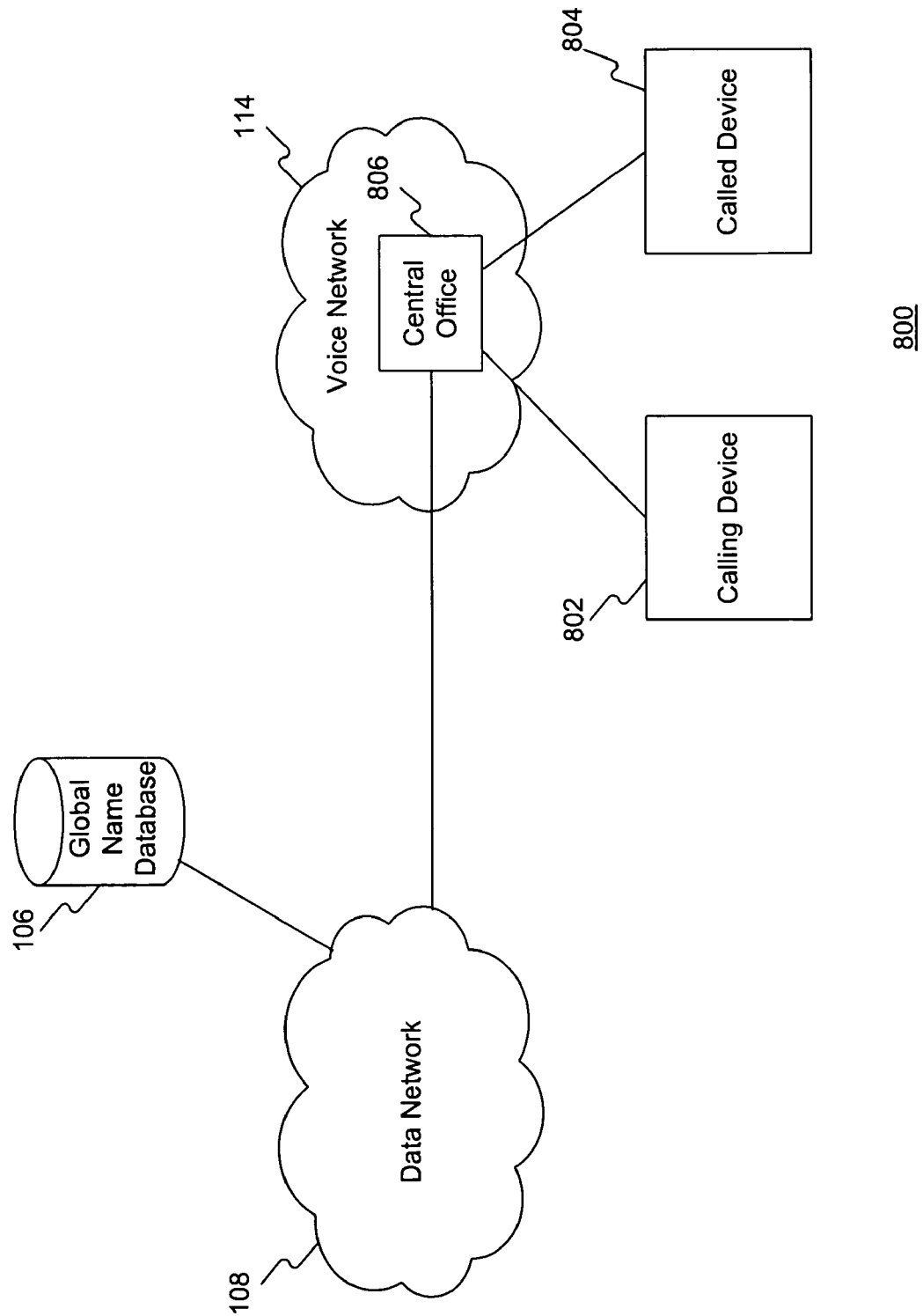
FIG. 8 is a diagram of an exemplary central office environment in which features and aspects consistent with the principals of the present invention may be implemented.

FIG. 8 is a diagram of an exemplary central office environment 800 in which features and aspects consistent with the principals of the present invention may be implemented. In one embodiment, central office environment 800 of FIG. 8 may exist as part of network environment 100 of FIG. 1. The number of components in environment 800 is not limited to what is shown and other variations in the number of arrangements of components are possible, consistent with embodiments of the invention. The components of FIG. 8 may be implemented through hardware, software, and/or firmware. Central office environment 800 may include calling device 802, called device 804, central office 804, global name database 106, data network 108, and voice network 114.

Calling device 802 may be utilized by a user to initiate a call to another device, such as called device 804. Calling device 802 may be implemented using, for example, a communication device 112. As such, calling device 802 enables a user to enter a name or series of characters to initiate a call. Called device 804 may also be implemented using a communication device 112.

Central office 806 may include standard central office functionality. As such, central office 806 may be a place where customer lines are terminated and switching equipment to interconnect those lines with other networks is located. Central office 806 may also include the added functionality of recognizing when a call is initiated using a name or series of characters, and then communicating with global name database 106 via data network 108 in order to translate the name or series of characters in a telephone number.

Figure 9:
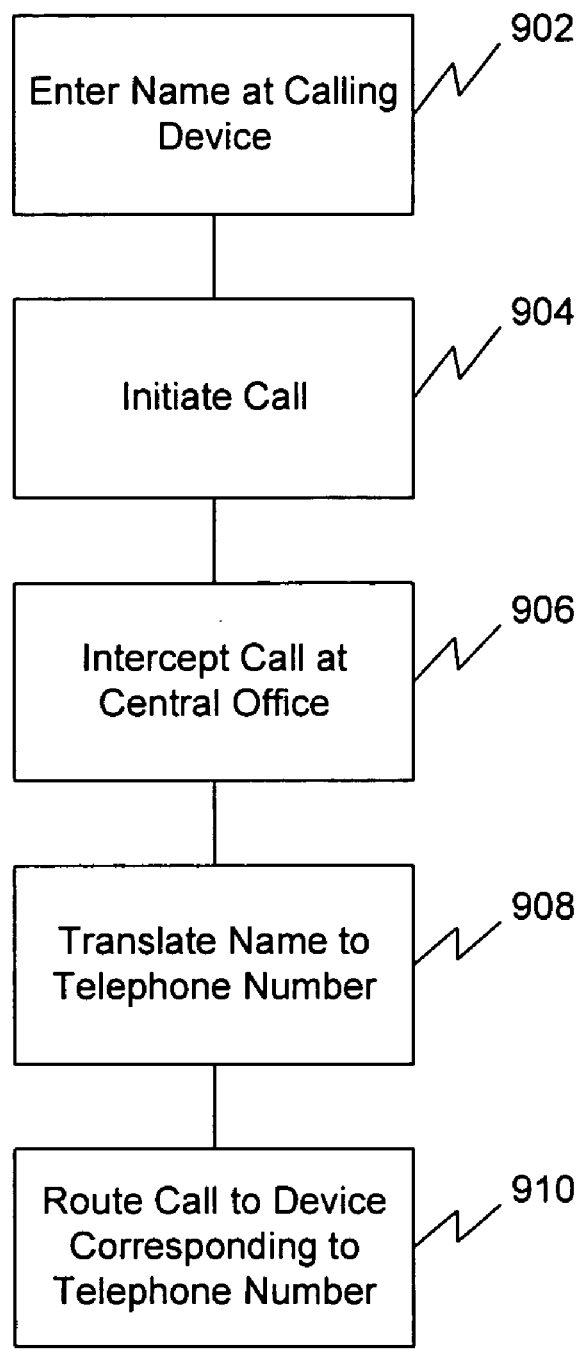
FIG. 9 shows a flowchart of an exemplary method for connecting a call using a name or series of characters in a central office environment, consistent with the principles of the present invention.

FIG. 9 shows a flowchart of an exemplary method for connecting a call using a name or series of characters in a central office environment, consistent with the principles of the present invention. Although the steps of the flowchart are described in a particular order, one skilled in the art will appreciate that these steps may be performed in a modified or different order. Further, one or more of the steps in FIG. 9 may be performed concurrently or in parallel.

A user may begin by entering a name or series of characters at a calling device, such as calling device 802 (step 902). Once the name or series of characters has been entered, calling device 802 may initiate a call (step 904). In one embodiment, the call may be routed from calling device 802 to a voice network, such as voice network 114. Central office 806 may then intercept the call (step 906).

The added functionality of central office 806 may recognize that the call was initiated using a name or series of characters, and proceed to generate and send a query to global name database 106 via data network 108 in order to translate the name or series of characters into a telephone number (step 908).

The query may include information reflective of the name or series of characters entered by the user at calling device 802. Global name database 106 then returns the corresponding telephone number to central office 806. Thereafter, central office 806 routes the call to a device, such as called device 804, that corresponds to the telephone number returned from global name database 106 (step 910). Further information on translating a name or series of characters to a telephone number is provided below with reference to FIGS. 10 and 11.

FIG. 10 shows an exemplary table 1000 used to translate names to telephone numbers, consistent with the present invention. Table 1000 represents a portion of one of the one or more tables that may be stored in global name database 106 or 116 to translate names or series of characters into telephone numbers. Although table 1000 has a particular format, one of ordinary skill in the art will appreciate that other formats may be utilized.

Table 1000 stores a mapping of names to telephone numbers. Column 1002 shows various names that may be entered by a user at a suitable communication device, and column 1004 shows the telephone numbers corresponding to the names of column 1002.

Consistent with the present invention, it is possible for one or more users to associate multiple names with one telephone number. For example, entries 1006, 1008, and 1010 show three different names associated with the same telephone number. More particularly, the names Elizabeth Smith, Beth Smith, and John Smith are all associated with the telephone number, 202-321-1111. Elizabeth Smith and Beth Smith, for example, may be associated with the same user. However, the user may decide to give the name Elizabeth Smith to business and formal contacts, and give the name Beth Smith to friends and family. In this manner, when coupled with a caller ID display that identifies the name or series of characters entered by a calling party to place the call, the user with multiple names attached to one number may have an easy way of knowing whether or not the call is high priority. Such a caller ID function is further explained below with reference to FIG. 12.

A separate user may also use the same telephone number as that associated with the names Elizabeth Smith and Beth Smith. For example, a user may associate the name John Smith with the telephone number, 202-321-1111. This is useful in the situation where multiple people share the same telephone number. Using a caller ID display that identifies the name or series of characters entered by a calling party to place the call, the person for whom a call is intended may immediately be identified.

Also consistent with the present invention, one person or entity may associate the same username with multiple telephone numbers. For example, entries 1012, 1014, and 1016 show a single business associated with multiple different telephone numbers. Dominic's Restaurant is a single business entity that has multiple branches with different telephone numbers. If a user places a call to Dominic's Restaurant, for example, the user may be routed to the Dominic Restaurant closest to the user's calling location. More generally, the user may be routed to a particular telephone number based on user-defined preferences. Such preferences may include, for example, routing the call to a number closest to user location, routing the call to a pre-determined number based on the user's location (e.g., route a call to the Dominic's Restaurant by the user's office when the user is away from home, regardless of whether that is the Dominic's Restaurant closest to the user), routing the call to a pre-determined location based on the time of day, routing the call to a pre-determined location based on the day of the week, or any criteria desired by the user. The concept of associating the same name or series of characters with multiple telephone numbers is explained further below with reference to FIG. 11.

A separate user or entity is not permitted to use the same name as another user or entity. This way, a different restaurant or business may not also register the name Dominic's Restaurant, even if the name of that entity's business happens to be Dominic's Restaurant.

Figure 11:
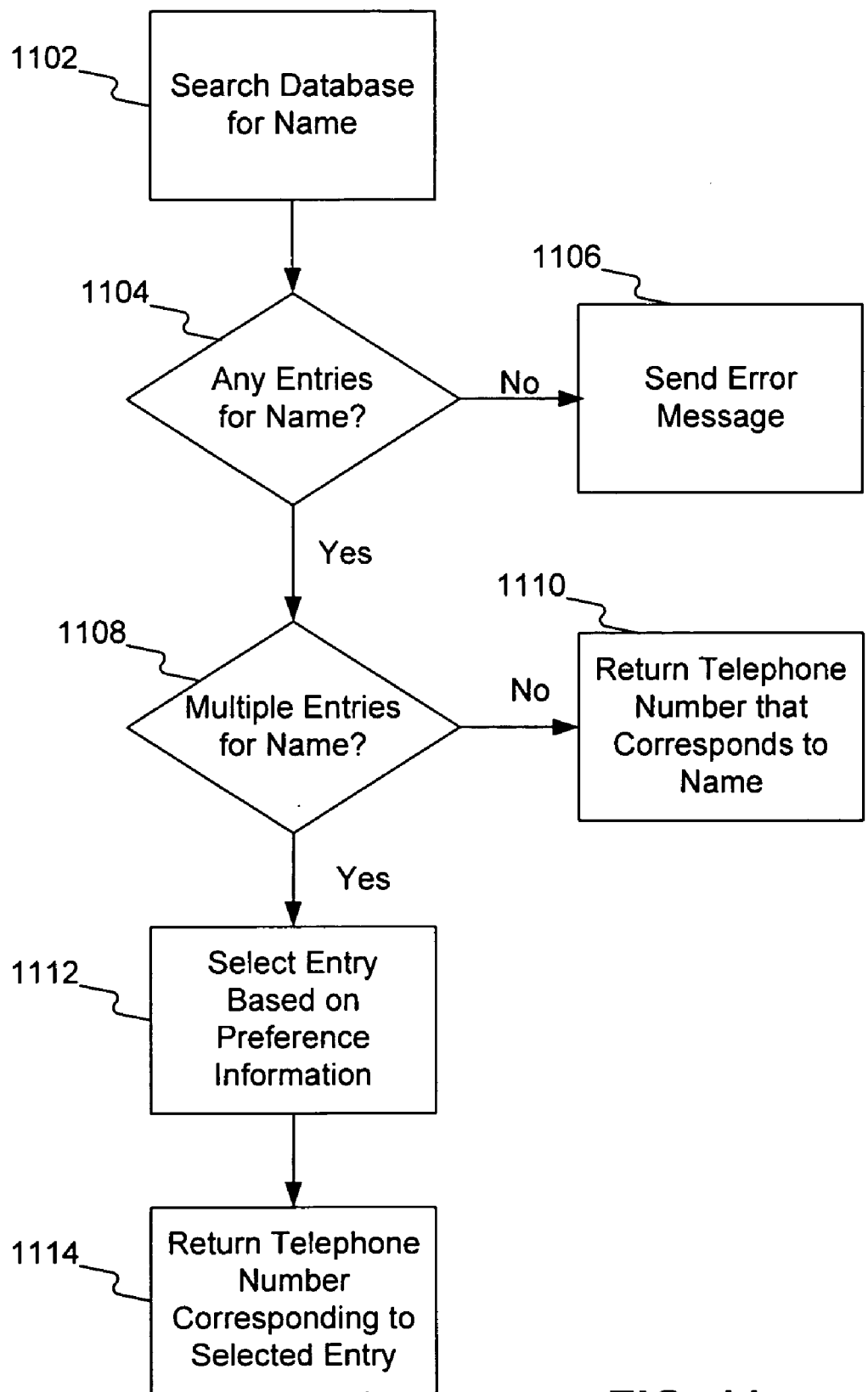
FIG. 11 shows a flowchart of an exemplary method for translating a name to a telephone number consistent with one aspect of the present invention.

FIG. 11 shows a flowchart of an exemplary method for translating a name to a telephone number consistent with one aspect of the present invention. Although the steps of the flowchart are described in a particular order, one skilled in the art will appreciate that these steps may be performed in a modified or different order. Further, one or more of the steps in FIG. 11 may be performed concurrently or in parallel.

In one embodiment, the steps of FIG. 11 may be used to implement the translating of steps 312, 508, 706, and 908 from FIGS. 3, 5, 7, and 9, respectively. When a global name database, such as global name database 106 or 116, receives a query related to a name or series of characters, the global name database may initiate a search for the name or series of characters (step 1102). The global name database may determine whether or not there are any entries for the name or series of characters (step 1104). If not, then the global name database may return an error message so that the user who initiated the call may be presented with an indication that the entered name or series of characters is invalid (step 1106).

If the global name database finds an entry corresponding to the name or series of characters, then a determination is made as to whether there are multiple entries for the same name or series of characters (step 1108). If there is only one entry, then the global name database may proceed to return the telephone number that corresponds to the name or series of characters (step 1110). If, however, there are multiple entries, then one of the plurality of entries needs to chosen. One way to choose one of the entries is to select an entry based on preference information associated with the user that placed the call (step 1112).

Such preference information may include, for example, information indicating that the call should be routed to a number closest to user location, information indicating that the call should be routed to a pre-determined number based on the user's location (e.g., route a call to the Dominic's Restaurant by the user's office, when the user is away from home, regardless of whether that is the Dominic's Restaurant closest to the user), information indicating that the call should be routed to a pre-determined location based on the time of day, information indicating that the call should be routed to a pre-determined location based on the day of the week, information indicating that the call should be routed to a pre-determined location based on the type of device being used to place the call, or any criteria desired by the user.

User preference information, for example, may be stored in one or more of several locations, such as a communication device 102 or 112 being used to place the call, in a memory resident in service center 110, on a web server being used to facilitate the call, on a computer 104 being used to initiate a click-to-dial call, in a database associated with a service control point, etc.

In order to properly select an entry, the various environments of FIGS. 1, 2, 4, 6, and 8, may include additional components. For example, if selection is to occur based on the number closest to the user, then additional components may be needed to determine the location of the user placing the call. In the case of selecting a number based on the day of the week or time of day, calendar functionality may be needed in order to allow a user to assign days and/or times to different numbers.

Once one of the entries has been selected, the global name database may return the telephone number that corresponds to the selected entry (step 1114). Thereafter, the call may be completed to the returned telephone number.

Returning to step 1112, instead of the global name database itself performing the act of selecting the entry based on preference information, another component may perform the selecting. For example, in a situation where an intelligent peripheral (IP) communicates with a global name database to resolve a name or series of characters to a telephone number (e.g., such as is shown in FIGS. 2 and 3), the global name database may return multiple telephone numbers to the IP (assuming multiple numbers were assigned to the same name). The IP in this case may proceed to perform the processing needed to select one of the plurality of telephone numbers. Similarly, a gateway 404 or 406, a communication device 102 or 112, a computer 104, service center 110, central office 806, or any other suitable component may be responsible for performing the selecting.

Figure 12:
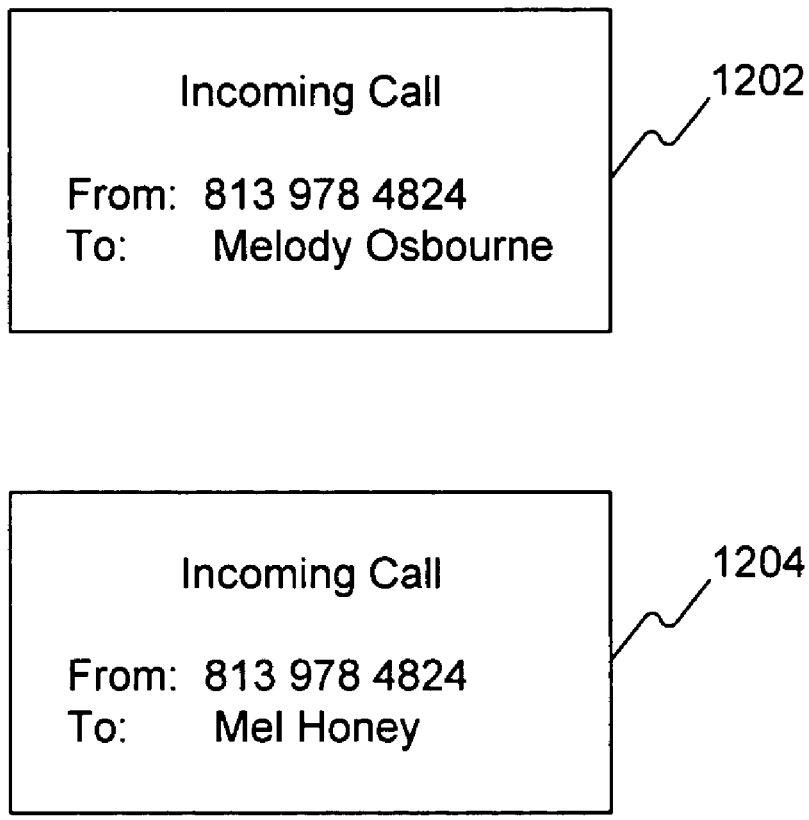
FIG. 12 is a diagram of exemplary caller ID displays consistent with the present invention.

FIG. 12 is a diagram of exemplary caller ID displays consistent with the present invention. FIG. 12 depicts two separate caller ID displays 1202 and 1204. Caller ID display 1202 shows an incoming call from a certain telephone number to Melody Osbourne. Suppose that Melody has two names registered for the same telephone number with a global name database. The first is Melody Osbourne. Melody provides the name Melody Osbourne to business or formal contacts. Therefore, when Melody is presented with caller ID information such as that shown in caller ID display 1202, Melody immediately knows that the person calling is a business or formal contact.

Melody's second registered name is Mel Honey, which she provides only to friends and family. When Melody is presented with caller ID information such as that shown in caller ID display 1204, Melody knows that the incoming call is from a friend or family member. Depending on whether Melody views business calls or calls from friends and family as more important, she can decide whether or not she should answer the call, without needing to know the telephone number of the device originating the call.

In one embodiment, if the caller has one or more names registered with a global name database, the caller may choose to display a registered name in addition to or instead of the telephone number associated with the name in a caller ID display to be presented to the called party. This way, the called party can immediately recognize the identity of the caller. In the case that the caller has more than one registered name, the caller may decide which of the names is displayed in the caller ID display.

While the present invention has been described in connection with various embodiments, many modifications will be readily apparent to those skilled in the art. For example, users may opt to protect their accounts with a password in order to filter stray calls. A party calling a person with a name protected by a password may need to enter password information after a global name database determines that a password exists for the entered name or series of characters. A password, for example, may be alphanumeric and may be stored in a global name database along with the name and telephone number information.

Also, in one embodiment, different global name databases may be kept for different types of calls or different types of devices. For example, separate global name databases may be maintained for voice calls, video calls, IP telephony calls, etc.

Different global name databases may also be maintained for different geographical locations, such as countries, so that it is possible to have the same name registered in different countries even though they have different telephone numbers associated with them. For example, systems and methods consistent with the present invention can detect that a caller with a registered name is calling a different country, and if the caller has chosen to display the name to the called party (e.g., in a caller ID display), then an indication of the caller's country can be included in the display. Alternatively, the caller may enter an indication of the country when placing the call so that the country is displayed to the called party. Exemplary indications of a country may include country codes or other abbreviation for countries, as well as the full name of countries.

While the exemplary global name databases depicted above in various embodiments associate 10-digit telephone numbers with names, one of ordinary skill in the art will appreciate that identifiers other than telephone numbers can used (e.g., an IP address or other identifier capable of uniquely identifying a device). One of ordinary skill in the art will also appreciate that telephone numbers and other identifiers may have more or less than 10-digits. FIG. 13 shows an exemplary table 1300 used to translate names to device identifiers, consistent with the present invention. Table 1300 represents a portion of one of the one or more tables that may be stored in global name database 106 or 116 to translate names or series of characters into device identifiers. Although table 1300 has a particular format, one of ordinary skill in the art will appreciate that other formats may be utilized.

The exemplary table 1300 of FIG. 13 shows a mapping of names or series of characters to device identifiers. Table 1300 also associates a device type with a name-device identifier mapping. One of ordinary skill in the art will appreciate that it may not be necessary to include a device type. Exemplary device types shown in table 1300 include an IP phone, a video phone, and an IMEI (International Mobile Equipment Identity) that may be associated, for example, with a SIMM card in a mobile telephone. One of ordinary skill in the art will appreciate that other device types may be used in conjunction with other device identifiers, and that table 1000 or table 1300 may include mappings of names or series of characters to telephone numbers as well as to device identifiers.

Moreover, one skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM, in the form of instructions executable by a processing device. Accordingly, embodiments of the invention are not limited to the above described embodiments and examples, but instead is defined by the appended claims in light of their full scope of equivalents.

What is claimed is:

1. A method comprising:
   receiving data pertaining to a call from a user to a called party, the data including name information that corresponds to the called party;
   sending a query to a database to search for a telephone number that corresponds to the name information;
   determining whether the database has multiple telephone numbers that correspond to the name information;
   selecting, when the name information corresponds to multiple telephone numbers, one of the multiple telephone numbers based on preference information associated with the user;
   routing the call to a device associated with the selected telephone number; and
   sending to the device a notification of the call, the notification including information reflecting the name information that corresponds to the called party, wherein the called party has multiple names for the destination telephone number registered in the database, and the name information reflects only one of the multiple names.

2. The method of claim 1, wherein the call is initiated by the user entering the name information at a calling device.

3. The method of claim 1, wherein the call is initiated by an action of the user on a data network.

4. The method of claim 1, further comprising:
   providing an error message to the user based on a determination that there are no telephone numbers that correspond to the name information.

5. The method of claim 1, wherein selecting further comprises selecting one of the multiple telephone numbers based on at least one of: proximity of an entity associated with said one of the multiple telephone numbers to a location of the user, a time of day, a date, or a type of device used to initiate the call.

6. The method of claim 1, wherein the call is connected over a data network.

7. A secondary storage device storing instructions executable by a processor and readable by the processor, the instructions causing the processor to perform the method of claim 1.

8. A method for connecting a call using name information, comprising:
   receiving data pertaining to a call from a user to a called party, the data including unique name information that corresponds to the called party;
   sending a query to a database to search for a telephone number that corresponds to the unique name information;
   retrieving a telephone number that corresponds to the unique name information from the database;
   routing the call over a voice network to a device associated with the retrieved telephone number; and
   sending to the device a notification of the call, the notification including information reflecting the unique name information that corresponds to the called party, wherein the called party has multiple names for the destination telephone number registered in the database, and the unique name information reflects only one of the multiple names.

9. The method of claim 8, wherein the call is initiated by the user entering the name information at a calling device.

10. The method of claim 8, wherein the call is initiated by an action of the user on a data network.

11. The method of claim 8, further comprising:
    providing an error message to the user based on a determination that there are no telephone numbers that correspond to the unique name information.

12. A secondary storage device storing instructions executable by a processor and readable by the processor, the instructions causing the processor to perform the method of claim 8.

13. A method comprising:
    receiving data pertaining to a call from a user to a called party, the data including name information that corresponds to the called party;
    sending a query to a database to search for a telephone number that corresponds to the name information;
    retrieving a destination telephone number that corresponds to the name information from the database;
    routing the call to a device associated with the destination telephone number; and
    sending to the device a notification of the call, the notification including information reflecting the name information that corresponds to the called party, wherein the called party has multiple names for the destination telephone number registered in the database, and the name information reflects only one of the multiple names.

14. The method of claim 13, wherein the call is initiated by the user entering the name information at a calling device.

15. The method of claim 13, further comprising:
providing an error message to the user based on a determination that there are no telephone numbers that correspond to the name information.

16. The method of claim 13, wherein retrieving comprises:
determining whether the database has multiple telephone numbers that correspond to the name information; and
selecting, when the name information corresponds to multiple telephone numbers, one of the multiple telephone numbers as the destination telephone number based on preference information associated with the user, including at least one of: proximity of an entity associated with said one of the multiple telephone numbers to a location of the user, a time of day, a date, or a type of device used to initiate the call.

17. The method of claim 13, wherein the call is connected via a data network.

18. A secondary storage device storing instructions executable by a processor and readable by the processor, the instructions causing the processor to perform the method of claim 13.

* * * * *